(12) United States Patent
Wu et al.

(10) Patent No.: US 11,199,644 B2
(45) Date of Patent: Dec. 14, 2021

(54) IMAGING OF GEOLOGICAL SUBSURFACE FEATURES

(71) Applicant: King Abdullah University of Science and Technology, Thuwal (SA)

(72) Inventors: Zedong Wu, Thuwal (SA); Tariq Ali Alkhalifa, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 333 days.

(21) Appl. No.: 16/331,599

(22) PCT Filed: Sep. 8, 2017

(86) PCT No.: PCT/IB2017/055433
§ 371 (c)(1),
(2) Date: Mar. 8, 2019

(87) PCT Pub. No.: WO2018/047111
PCT Pub. Date: Mar. 15, 2018

(65) Prior Publication Data
US 2019/0227187 A1    Jul. 25, 2019

Related U.S. Application Data

(60) Provisional application No. 62/385,039, filed on Sep. 8, 2016.

(51) Int. Cl.
*G01V 1/34* (2006.01)
*G01V 1/28* (2006.01)

(52) U.S. Cl.
CPC ............ *G01V 1/345* (2013.01); *G01V 1/28* (2013.01); *G01V 2210/675* (2013.01)

(58) Field of Classification Search
CPC .......... G01V 1/28; G01V 1/282; G01V 1/345; G01V 1/364
See application file for complete search history.

(56) References Cited

U.S. PATENT DOCUMENTS

| | | | | |
|---|---|---|---|---|
| 9,910,189 | B2* | 3/2018 | Dickens | G06F 17/12 |
| 10,725,190 | B2* | 7/2020 | Gratacos | G01V 1/282 |
| 2016/0202375 | A1 | 7/2016 | Waheed et al. | |
| 2018/0164453 | A1* | 6/2018 | Esser | G01V 11/00 |

FOREIGN PATENT DOCUMENTS

WO    2014102616    7/2014

OTHER PUBLICATIONS

Alkhalifah, "An acoustic wave equation for anisotropic media", Geophysics, vol. 65, No. 4, 2000, 1239-1250.

(Continued)

*Primary Examiner* — Bryan Bui
(74) *Attorney, Agent, or Firm* — Billion & Armitage

(57) ABSTRACT

Embodiments of the present disclosure describe methods for efficient wavefield solutions, the methods including defining a wave equation as a linear portion and as a nonlinear portion; and solving the wave equation via an iterative process, the iterative process including, at each iteration, performing LU decomposition before solving the nonlinear portion, or obtaining best finite difference coefficients by solving an optimization equation.

20 Claims, 13 Drawing Sheets

(56) References Cited

OTHER PUBLICATIONS

Bellman, "Dynamic Programming", Science, vol. 153, Jul. 1, 1966, 34-37.
Waheed, et al., "An efficient wave extrapolation method for anisotropic media with tilt", Geophysical Prospecting, 63,, 2015, 1126-1141.
Waheed, et al., "Effective ellipsoidal models for wavefield extrapolation in tilted orthorhombic media", Stud. Geophys. Geod., 60, 2016, 349-396.
Wu, et al., "The optimized expansion based low-rank method for wavefield extrapolation", Geophysics, vol. 79, No. 2, Feb. 26, 2014, T51-T60.
Notification of Transmittal of the International Search Report and the Written Opinion of the International Searching Authority, or the Declaration for PCT/IB2017/055433 dated Dec. 1, 2017.
Bai, et al., "Attenuation compensation in viscoacoustic reserve-time migration", SEG Houston 2013 Annual Meeting, 2013, 3825-3830.
Hu, et al., "Preconditioned non-linear conjugate gradient method for requency domain full-waveform seismic inversion", Geophysical Prospecting, 59, 2011, 477-491.
Riyanti, et al., "A new iterative solver for the time-harmonic wave equation", Geophysics, vol. 71, No. 5, Sep./Oct. 2006, E57-#63.

\* cited by examiner

IMAGING OF GEOLOGICAL SUBSURFACE FEATURES

BACKGROUND

Wavefield modeling is an essential part of imaging and inversion. For waves generally, including seismic and electromagnetic waves, the medium in which the waves propagate (e.g., the Earth) frequently exhibits anisotropic behavior at frequencies recorded and at frequencies of interest. The medium also induces other physical phenomena that are difficult to model using available computational devices and methods. For example, modeling pure single mode wavefields propagating through anisotropic media frequently requires solving a nonlinear, complex anisotropic wave equation. Solving anisotropic wave equations also present challenges relating to acoustic approximation, dispersion, and cost. Models of seismic waves propagating through anisotropic media, for example, often introduce shear wave artefacts, which require filtering and increase costs.

Wavefield extrapolation and simulation (and wave equation solutions in general) are used in seismic modeling, imaging, and inversion and they tend to consume 90% of the computational effort in the Oil and Gas exploration industry. The process is governed by the wave equation and uses knowledge of the medium elastic and anisotropic (including in some cases poroelastic) properties. Since seismic data are recorded using sensors distributed over a limited region (for example, the Earth's surface) of the domain of interest, wavefield extrapolation by solving the wave equation is needed, along with the medium properties. Recently, with high-resolution data, the industry has recognized that anisotropic behavior of wavefields is prevalent in seismic data. Thus, accurate simulation of wave propagation in the subsurface includes anisotropy in wave extrapolation. However, the cost of wavefield extrapolation in inhomogeneous anisotropic media exceeds that in isotropic inhomogeneous media.

Simulation of wave propagation for imaging of seismic data is computationally intensive because of the amount of data and the intensity of computational operations that are applied. Because the Earth is complex and anisotropic, extrapolation methods based on more complicated wave equations are used to simulate wave propagation. Wave propagation speed can change as a function of position and possibly the direction of propagation (anisotropy). The cost of extrapolating wavefields in anisotropic media can exceed that in isotropic media. Using the isotropic extrapolation equations to approximately solve for anisotropic effects can reduce the computational cost. This is especially true when the anisotropy exhibits a tilted (from the vertical) symmetry axis. The kinematics of the wavefield, which may be appropriately represented in the high-frequency asymptotic approximation by the eikonal equation, can be used to develop effective isotropic models. The developed models may then be used to efficiently extrapolate the propagation of anisotropic wavefields using isotropic operators that are relatively cheaper. These effective velocity models are source dependent and tend to embed the anisotropy influence in the inhomogeneity representation

SUMMARY

In general, embodiments of the present disclosure describe methods for wavefield modeling and efficient wave equation solutions.

Accordingly, embodiments of the present disclosure describe methods for efficient wavefield solutions comprising defining a wave equation as a linear portion and as a nonlinear portion and solving the wave equation via an iterative process, the iterative process including, at each iteration, performing LU decomposition before solving the nonlinear portion.

Embodiments of the present disclosure also describe methods for efficient wavefield solutions comprising reducing the dispersion difference between the exact dispersion relation and numerical dispersion relation. An efficient and accurate representation of the inverse of the stiffness matrix in both isotropic and anisotropic media is provided.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which.

DETAILED DESCRIPTION

Figure 1:
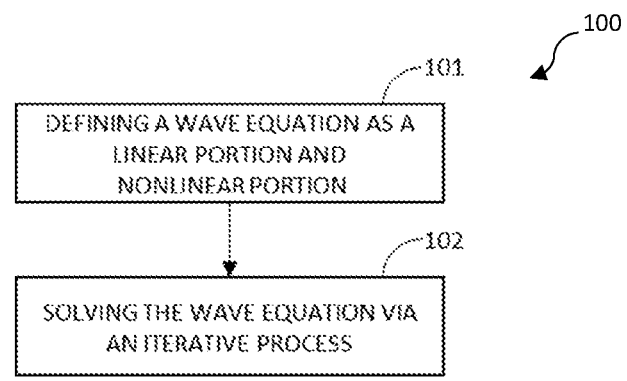
FIG. 1 illustrates a block flow diagram of a method for processing wave data, according to one or more embodiments of the present disclosure.

The invention of the present disclosure relates to simulation of wave propagation for imaging and inversion of wave data, including, for example, seismic and electromagnetic data. In particular, one embodiment of the invention of the present disclosure relates to methods of solving a Helmholtz form of a wave equation in the frequency domain via an iterative process to model wavefields propagating through non-uniform complex media without introducing shear wave artefacts. The methods of the present disclosure build a solution of the Helmholtz form of the wave equation in the frequency domain from iteratively solving a simpler form and by embedding the solution of the previous iteration in a source function or effective velocity. In this way, the methods of the present disclosure reduce costs, increase efficiency, and improve the rate at which a solution is obtained.

Another embodiment of the invention of the present disclosure relates to obtaining the best finite difference between the exact dispersion relation and numerical dispersion relation. An efficient and accurate representation of the stiffness matrix in both isotropic and anisotropic media is obtained.

Solving the wave equation in the frequency domain one frequency at a time using the Helmholtz representation of the wave equation presents many benefits. For instance, the reduced dimension of the wavefield given by a single frequency at a time provides efficiency and computer memory features. In addition, by finding the inverse of the stiffness matrix (Green's function) before solving the nonlinear portion, the application to different sources, whether actual or secondary, become incredibly efficient. Although a major drawback of the Helmholtz solver is finding the inverse of the Stiffness Matrix in 3D, especially for complex media, such as anisotropic and viscoelastic media, the present invention presents an efficient and accurate representation of the inverse of the Stiffness Matrix in complex media. Wavefields can be produced for arbitrary source functions including secondary sources. In fact, the stiffness matrix linearly relating the wavefield to the source function is far more complex in media in which the physics is complex like anisotropy and viscoelasticity.

In acoustic anisotropic media, the Stiffness Matrix typically is higher dimensional relative to isotropic media because additional wavefields are required to represent anisotropic behavior. The additional wavefields increase the number of solutions required to transform the inherently pseudo differential equation into a linear differential equation. In addition, with respect to seismic waves in anisotropic media, for example, the additional wavefields introduce shear wave artefacts into the solution. Removing the shear wave artefacts requires filtering, which increases the cost of the computation. Other complexities are also introduced when elastic and/or viscoelastic media are examined.

Wave propagation is described as a pseudo differential equation. A partial differential operator, L, is defined to describe a dispersion relation for complex media, which includes, but is not limited to, one or more of anisotropic media, viscoelastic media, and viscoacoustic media, or any other media where the physics requires a more complex stiffness matrix. In one embodiment, the operator L is represented as a function of a wave number vector, material parameters, and angular frequency:

$$L(\vec{k}, \vec{p}, w) = 0$$

where $\vec{k}$ is the wavenumber vector, $\vec{p}$ is the material parameters, and w is the angular frequency.

The above formulation of L can also be represented as a function of a normalized wavenumber vector computed from a gradient of a wavefield in space:

$$L(\nabla u, \vec{n}, \vec{p}, w) = 0$$

$$\text{where } \vec{n} = \frac{\nabla u}{|\nabla u|}$$

where $\vec{n}$ is the normalized wavenumber vector computed from the gradient of the wavefield $u(\vec{x}, w)$ in space coordinates $\vec{x}$. In the frequency domain, the relative partial differential equation is represented as:

$$L\left(\nabla u, \vec{n} = \frac{\nabla u}{|\nabla u|}, \vec{p}, w\right) = f$$

where $f$ is a source function. The operator L consists of spatial derivatives among operations in which the wavefield u is nonlinear in complex physics media.

Given that the operator L can describe complex media, L's corresponding partial differential equation can be nonlinear. In embodiments where L's corresponding partial differential equation is nonlinear, the linear parts are separated from the nonlinear parts of L.

$$L_1(\nabla u, \vec{p}, w) + L_2(\nabla u, \vec{n}, \vec{p}, w) = f$$

Generally, $L_1$ is a linear partial differential operator and is a good approximation of L. In addition, $L_1$ is generally much easier to solve than L.

FIG. 1 illustrates a block flow diagram of a method 100 for efficient wavefield solutions, according to an embodiment of the present disclosure. At step 101, the wave equation is defined by a linear partial differential operator $L_1$ (e.g., a linear portion) and a nonlinear partial differential operator $L_2$ (e.g., a nonlinear portion):

$$L_1(\nabla u, \vec{p}, w) + L_2(\nabla u, \vec{n}, \vec{p}, w) = f$$

where $\vec{k}$ is the wavenumber vector, $\vec{p}$ is the material parameters, w is the angular frequency, $\vec{n}$ is the normalized wavenumber vector computed from the gradient of the wavefield $u(\vec{x}, w)$ in space coordinates $\vec{x}$, and $f$ is the source function.

The linearized form of the operator is used to solve for an initial u for the particular source $f$. The initial u may be extracted from other approaches including a time domain solution followed by Fourier transforms.

At step 102, the wave equation is solved via an iterative process. In one embodiment, a fixed-point iteration method is utilized. The operator L is rearranged for the iterative process, with the linear portion $L_1$ provided on the left-hand side and the nonlinear portion $L_2$ provided on the right-hand side:

$$L_1(\nabla u_{i+1}, \vec{p}, w) = -L_2(\nabla u_i, \vec{n}_i, \vec{p}, w) + f$$

where i is the iterative index. For an initial guess $u_0$, the solution is obtained by solving the wave equation as follows:

$$L_1(u_0) = f$$

For a given iteration i, the solution $u_{i+1}$ is obtained by solving the same wave equation. In addition, since the same equation is solved at each iteration, any solver can be performed before the nonlinear iteration. In some embodiments, the solver performed before the nonlinear iteration is Helmholtz solver and/or LU decomposition. This allows the above equation to be solved efficiently and at a lower cost for arbitrary source functions, including secondary sources, with a more accurate representation of the inverse of the stiffness matrix. While a fixed-point iteration method is used, any iterative method and/or iterative process can be used for solving the nonlinear equation to speed up convergence.

The following Examples are intended to illustrate the above invention and should not be construed as to narrow its scope. It should be understood that numerous variations and modifications may be made while remaining within the scope of the invention.

Example 1

Wave Propagation in Transverse Isotropic Media

Wave propagation in transverse isotropic media can be modeled using the following dispersion relation for transverse isotropic (VTI) media:

$$w^2 = \frac{1}{2}\left[v_0^2 k_z^2 + (1+2\varepsilon)v_0^2 k_h^2 + \sqrt{(v_0^2 k_z^2 + (1+2\varepsilon)v_0^2 k_h^2)^2 - 8(\varepsilon - \delta)k_h^2 k_z^2}\right]$$

where $k_h^2 = k_x^2$ in a two-dimensional problem and $k_h^2 = k_x^2 + k_y^2$ in a three-dimensional problem. The above equation can be rearranged as follows:

$$w^2 = (1 + F(u))(v_0^2 k_z^2 + (1+2\varepsilon)v_0^2 k_h^2)$$

where F(u) is:

$$F(u) = \frac{1}{2}\left[\sqrt{1 - \frac{8(\varepsilon - \delta)\eta_x^2 \eta_z^2}{((1+2\varepsilon)\eta_x^2 + \eta_z^2)^2}} - 1\right]$$

The wave number vector $k_z^2$ can be formulated as $$\frac{\partial^2 u}{\partial z^2},$$

$k_h^2$ can be formulated as $$\frac{\partial^2 u}{\partial x^2} + \frac{\partial^2 u}{\partial y^2},$$

and $n_x^2$ can be approximated as $$\left|\frac{\partial u}{\partial x}\right|^2 + \left|\frac{\partial u}{\partial y}\right|^2.$$

The following nonlinear differential equation in two-dimensions is thus obtained:

$$w^2 u + \left(v_0^2 \frac{\partial^2 u}{\partial z^2} + (1+2\varepsilon)v_0^2 \frac{\partial^2 u}{\partial x^2}\right)(1 + F(u)) = f$$

The relative approximate operator L is defined as:

$$L_1(u) = w^2 u + \left(v_0^2 \frac{\partial^2 u}{\partial z^2} + (1+2\varepsilon)v_0^2 \frac{\partial^2 u}{\partial x^2}\right)$$

and $$L_2(u) = \left(v_0^2 \frac{\partial^2 u}{\partial z^2} + (1+2\varepsilon)v_0^2 \frac{\partial^2 u}{\partial x^2}\right)F(u)$$

The formulation for solving the above equations via a fixed-point iteration method is:

$$w^2 u_{i+1} + \left(v_0^2 \frac{\partial^2 u_{i+1}}{\partial z^2} + (1+2\varepsilon)v_0^2 \frac{\partial^2 u_{i+1}}{\partial x^2}\right) = f - \left(v_0^2 \frac{\partial^2 u_i}{\partial z^2} + (1+2\varepsilon)v_0^2 \frac{\partial^2 u_i}{\partial x^2}\right)F(u_i)$$

For a given iteration i, the solution $u_{i+1}$ is obtained by solving the same elliptic anisotropic equation for a known solution $u_i$. Since the equation solved for each iteration is unchanged, LU decomposition can be performed before the nonlinear iteration. The cost of the resulting algorithm is nearly the same as the cost of solving an elliptic anisotropic equation. The additional cost of the Matrix-vector multiplication pales in comparison with the cost of computing the inverse of the Stiffness matrix.

For the initial guess $u_0$, the solution can be obtained by solving the elliptic anisotropy equation provided below:

$$w^2 u_0 + \left(v_0^2 \frac{\partial^2 u_0}{\partial z^2} + (1+2\varepsilon)v_0^2 \frac{\partial^2 u_0}{\partial x^2}\right) = f$$

The wavefield $u_0$ represents the initial wavefield in which we place on the right-hand side as a modified source function based on the formula in paragraph.

Figure 2:
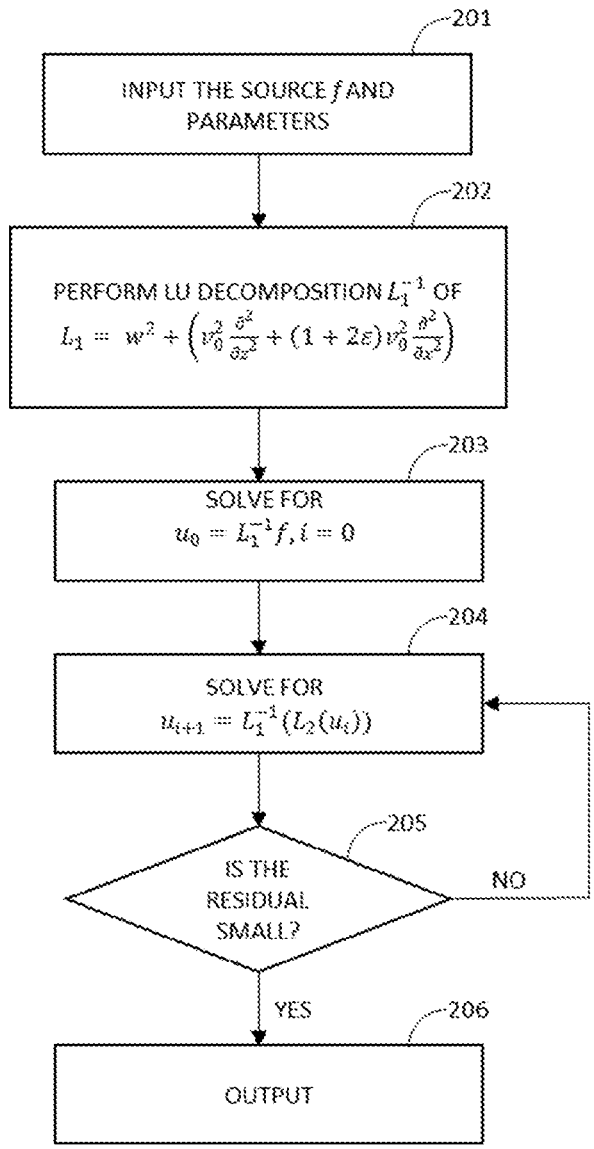
FIG. 2 illustrates a block flow diagram of a process for modeling wave propagation through transverse isotropic media, according to one or more embodiments of the present disclosure.

FIG. 2 illustrates a block flow diagram of a process for modeling wave propagation through transverse isotropic media, according to an embodiment of the present disclosure. At step 201, the source function and the following parameters are input into the wave equation: $v$, $\delta$, and $\varepsilon$, where $v$ is the velocity, $\delta$, and $\varepsilon$ are Thomsen's anisotropic parameter for representing VTI media.

At step 202, LU decomposition is computed, providing us with an effective $L_1^{-1}$ of $$L_1 = w^2 + \left(v_0^2 \frac{\partial^2}{\partial z^2} + (1+2\varepsilon)v_0^2 \frac{\partial^2}{\partial x^2}\right).$$

Methods for inverting $L_1$ and computing LU decomposition are many and available to available open source subroutines.

At step 203, the first iteration is solved, where i is equal to 0, for an initial guess, $u_0$.

$u_0 = L_1^{-1} f$, where $i=0$

The computational operation involved here are Matrix-Matric and Matrix-vector multiplications.

At step 204, the next iteration is solved for $u_{i+1}$.

$u_{i+1} = L_1^{-1}(L_2(u_i))$

The initial wavefield from [0042] is utilized as a source for the new wavefield. The computational operation involved here are Matrix-Matric and Matrix-vector multiplications.

At step 205, a determination is made as to whether or not the residual, $u_{i+1}-u_i$, is small. If not, a next iteration is performed for the solution $u_{i+1}$ until the residual is determined to be small. If the residual is small, at step 206, an output is obtained and the solution is solved. The output is given by the solution of the more complex wave equation.

Example 2

Simple Constant Anisotropic Parameters

The parameters are $\varepsilon=0.2$ and $(1+2\varepsilon)v_0^2=1.8$ km/s. The frequency is 10 Hz. The space sampling is 0.01 km. The shot is located in the middle of the region. Here, $$\eta = \frac{\varepsilon-\delta}{1+2\delta} \text{ and } \delta = \frac{\varepsilon-\eta}{1+2\eta}.$$

Figure 3A:
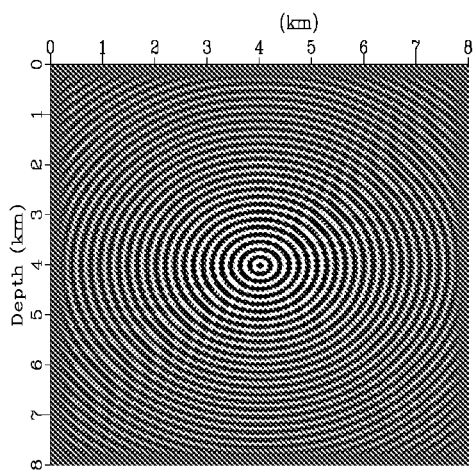
FIGS. 3A-3B illustrate a real part and an imaginary part of a wavefield, respectively, for $\eta=0$ with parameters $\varepsilon=0.2$, $(1+2\varepsilon)v_0^2=1.8$ km/s, and a frequency of 10 Hz, according to one or more embodiments of the present disclosure.
Figure 3B:
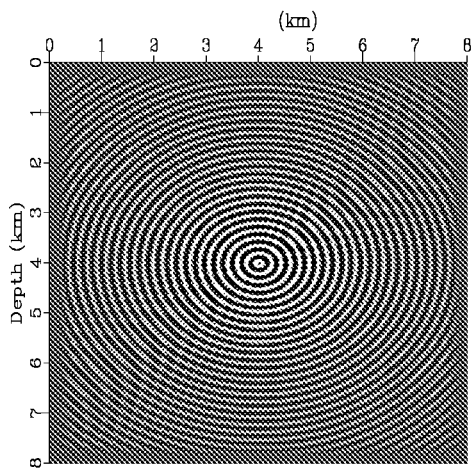
Figure 4A:
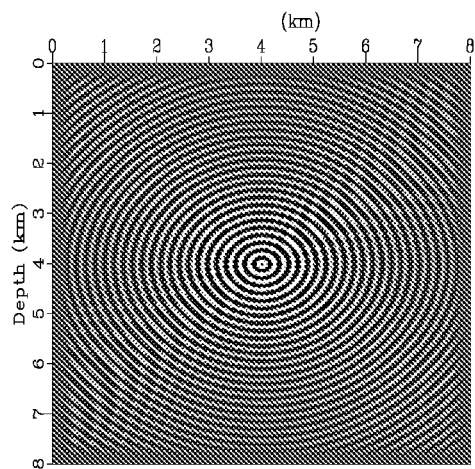
FIGS. 4A-4B illustrate a real part and an imaginary part of a wavefield, respectively, for $\eta=0.1$ with parameters $\varepsilon=0.2$, $(1+2\varepsilon)v_0^2=1.8$ km/s, and a frequency of 10 Hz, according to one or more embodiments of the present disclosure.
Figure 4B:
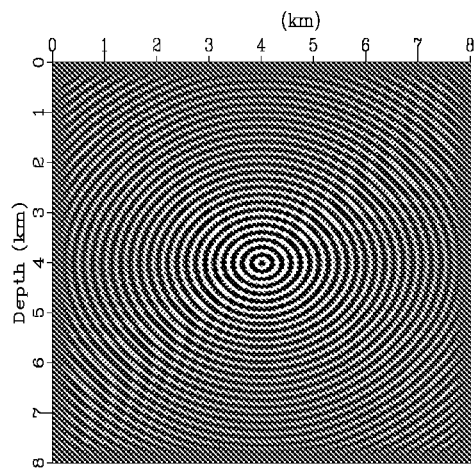
Figure 5A:
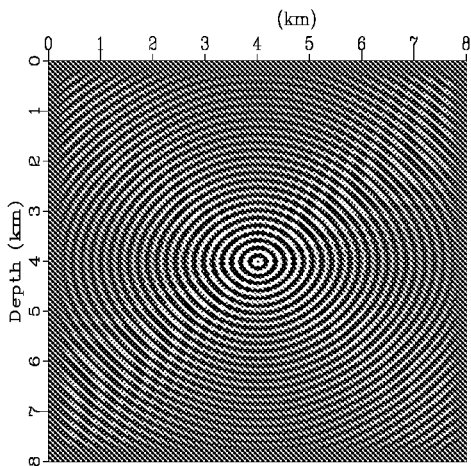
FIGS. 5A-5B illustrate a real part and an imaginary part of a wavefield, respectively, for $\eta=0.2$ with parameters $\varepsilon=0.2$, $(1+2\varepsilon)v_0^2=1.8$ km/s, and a frequency of 10 Hz, according to one or more embodiments of the present disclosure.
Figure 5B:
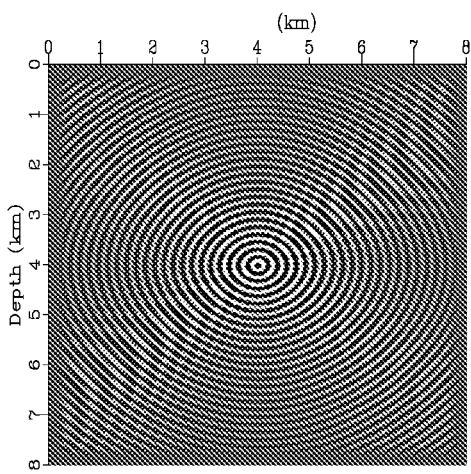
Figure 6:
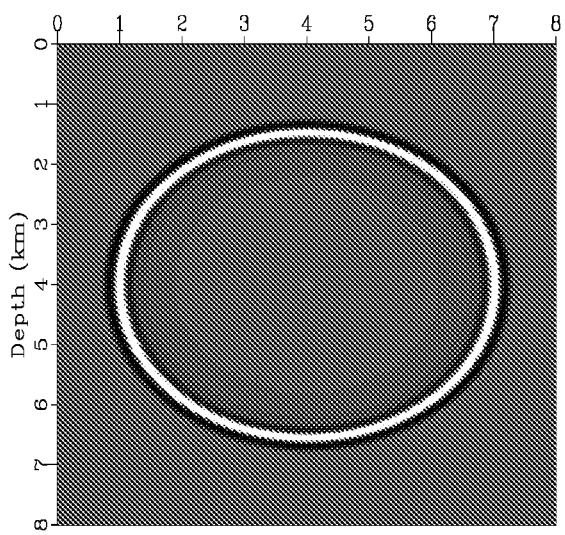
FIG. 6 illustrates a snapshot at 1.65 seconds of the sum of the wavefields for all frequencies for $\eta=0$, according to one or more embodiments of the present disclosure.
Figure 7:
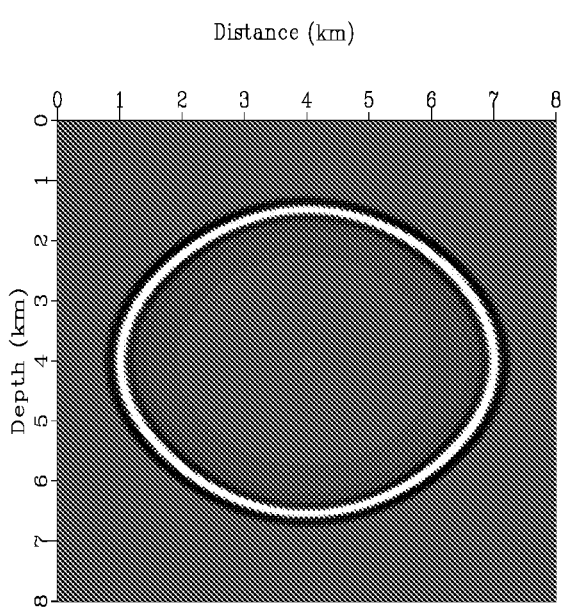
FIG. 7 illustrates a snapshot at 1.65 seconds of the sum of the wavefields for all frequencies for $\eta=0.2$, according to one or more embodiments of the present disclosure.

FIGS. 3-5 illustrate a wavefield for $\eta=0$, 0.1, and 0.2, respectively. As shown in FIGS. 3-5, no shear wave artefacts can be observed in the modeled wavefield. To confirm the absence of shear wave artefacts, the wavefield was obtained for all frequencies and then wavefields were summed for all frequencies with a snapshot taken at 1.65 seconds. FIGS. 6 and 7 illustrate snapshots at 1.65 seconds for $\eta=0$, 0.2, respectively, and confirm the absence of shear wave artefacts from the modeled wavefield. The cost of computing these wavefields was far less than the direction solution of the VTI form reproduced below from Example 1:

$$w^2 = \frac{1}{2}\left[v_0^2 k_z^2 + (1+2\varepsilon)v_0^2 k_h^2 + \sqrt{(v_0^2 k_z^2 + (1+2\varepsilon)v_0^2 k_h^2)^2 - 8(\varepsilon-\delta)k_h^2 k_z^2}\right]$$

Best Finite Difference Coefficient Model

The acoustic wave propagation, in general anisotropic media, can be described as a pseudo differential equation. The dispersion relation for general anisotropic media can be considered as:

$$\vec{L}(\vec{p}, \vec{k}, \omega) = 0 \tag{1}$$

In which, $\vec{L}$ depends on wave-number vector $\vec{k}$ material parameters, $\vec{p}$ and angular frequency $\omega$. Different operators $\vec{L}$ will describe different isotropic or anistropic (acoustic, elastic viscoelastic) behavior.

For example, for a three-dimensional isotropic acoustic medium, the dispersion equation is:

$$\vec{L}(\vec{p}, \vec{k}, \omega) = \frac{\omega^2}{v^2} - |\vec{k}|^2 = 0. \tag{2}$$

For transverse isotropic acoustic (VTI) media, $$\vec{L}(\vec{p}, \vec{k}, \omega) = \tag{3}$$

$$\omega^2 - \frac{1}{2}\left[v_z^2 k_z^2 + v_h^2 k_h^2 + \sqrt{(v_z^2 k_z^2 + v_h^2 k_h^2)^2 - \frac{8\eta}{1+2\eta}k_h^2 k_z^2}\right] = 0.$$

In more general cases, such as the elastic wave equation, $\vec{L}$ can be even a vector.

The relative discrete approximation operator at the point $\vec{x}$ from its neighborhood, $\{\vec{x}_i\}_{i=1}^n$, can be obtained through the following generation approximation formulation:

$$\sum_m F_m(\vec{p}, \omega) \sum_{i=1}^n \vec{a}_i^m \vec{u}(\vec{x}_i) = 0. \tag{4}$$

In the above formulation $F_m(, \vec{p}, w)$ is given m components of the approximation, $\vec{a}_i^m$ is the finite difference coefficients to be determined. $\vec{u}(\vec{x}_i)$ is the solution at $\vec{x}_i$.

The plane wave $$\vec{u}(\vec{y}) = \vec{u}_0 e^{i\vec{k}\cdot\vec{y}}$$

can be utilized in the discrete equation to obtain:

$$\sum_M F_M(\vec{p}, \omega) \sum_{i=1}^n \vec{a}_i^m C_i(\vec{x}, \vec{x}_i, \vec{k}) = 0 \tag{5}$$

In the above formulation, $$C_i(\vec{x}, \vec{x}_i, \vec{k}) = e^{i\vec{k}\cdot(\vec{x}_i-\vec{x})}I.$$

I is the identify vector. When $\vec{u}$ is a scalar function, I=1. When $\vec{u}$ is a vector, I is the identity vector of the same length.

Comparing the two dispersion equations (5) and (1), the variable, $\omega$, can be canceled to obtain a new equation:

$$\vec{R}(\vec{a}_i^m, \vec{p}, \vec{k}, \vec{x}_i - \vec{x}) = 0 \tag{6}$$

Equation (6) is satisfied by all $\vec{k} \in \Omega$, for a given range of $\Omega$. However, equation (6) can not be fully satisfied as coefficients $\vec{a}_i^m$ are limited. The best finite difference coefficients can be obtained by introducing a description of the difference between $\vec{R}$ and 0. For example, the best finite difference coefficients $\vec{a}_i^m$ can be obtained through solving the optimization equation:

$$\min_{\vec{a}_i^m} \|\vec{R}(\vec{a}_i^m, \vec{p}, \vec{k}, \vec{x}_i - \vec{x})\|. \tag{7}$$

In the above formulation, $\|\cdot\|$ can be any functional that can describe the difference between $\vec{R}(\vec{a}_i^m, \vec{p}, \vec{k}, \vec{x}_i - \vec{x})$ and the constant function 0. Through this optimization procedure, the best finite difference coefficients can be obtained for any given dispersion relation $\vec{L}$, components $F_m(\vec{p}, \omega)$, in any neighborhood group $\{\hat{x}_i\}_{i=1}^n$.

The previous example described a method to obtain the forward modeling operator for given material parameters. As shown from the above derivation, the finite coefficients depend on the material parameters.

The present disclosure also describes obtaining coefficients that fit the material requirements through the dispersion relation and also obtaining the coefficients that fit the observed data in a waveform inversion framework.

A description follows of a new waveform inversion scheme, including inverting the finite difference coefficients and the material parameters simultaneously. Consider first:

$$\min_{\vec{a}_i^m, \vec{p}, \vec{u}} \left\|\vec{R}(\vec{a}_i^m, \vec{p}, \vec{k}, \vec{x}_i - \vec{x})\right\| + J(\vec{u}, \vec{g}) + \sum_x \left\|\sum_m F_m(\vec{p}, \omega) \sum_{i=1}^n \vec{a}_i^m \vec{u}(\vec{x}_i) - f(x)\right\|_s^2. \tag{8}$$

In equation (8), the finite difference coefficients are optimized to describe the behavior of given material parameters. $J(\vec{u}, \vec{g})$ is the objective function which describes the difference between the modeled data $\vec{u}$ and observed data $\vec{g}$. $f(x)$ is the given source wavelet.

In a special case, the dispersion relation is explicitly given by:

$$\frac{\omega^2}{v_z^2} = L_0(\vec{p}, \vec{k}) \tag{9}$$

It is assumed that $L_0(\vec{p}, r\vec{K}, \omega) = r^2 L_0(\vec{p}, \vec{K}, \omega)$ for any $r$. For the case of the isotropic acoustic wave equation, $L_0(\vec{p}, k) = |\vec{k}|^2$. For the case of Tilted TI, $$L_0(\vec{p}, \vec{k}, \omega) = \frac{1}{2}\left[\tilde{k}_z^2 + B^2 \tilde{k}_h^2 + \sqrt{(\tilde{k}_z^2 + B^2 \tilde{k}_h^2)^2 - \frac{8\eta}{1+2\eta}\tilde{k}_h^2 \tilde{k}_z^2}\right] \tag{10}$$

In which, $\vec{p} = \{v_z, B, \eta, \theta\}$, $\tilde{k}_h = k_h \cos(\theta) + k_z \sin(\theta)$, $\tilde{k}_z = k_z \cos(\theta) - k_h \sin(\theta)$. $k_h^2 = k_x^2$ for a two-dimensional problem, $k_h^2 = k_x^2 + k_y^2$ for a three-dimensional problem and $$B = \frac{v_x}{v_z}$$

is the ratio between the horizontal velocity $V_x$ and vertical velocity $V_z$. One type of discretization operator includes:

$$\frac{\omega^2}{v_z^2} \sum_{i=1}^n a_i u_{\vec{x}+\vec{d}_i \Delta} + \frac{1}{\Delta^2} \sum_{i=1}^n b_i u_{\vec{x}+\vec{d}_i \Delta} \tag{11}$$

In such case, $$F_1(\vec{p}, \omega) = \frac{\omega^2}{v_z^2}, F_2(\vec{p}, \omega) = \frac{1}{\Delta^2}.$$

The relative dispersion relation is:

$$\frac{\omega^2}{v_z^2} \sum_{i=1}^n a_i e^{i\vec{k}\cdot\vec{d}_i \Delta} + \frac{1}{\Delta^2} \sum_{i=1}^n b_i e^{i\vec{k}\cdot\vec{d}_i \Delta} = 0 \tag{12}$$

Comparing equations (9) and (12) yields:

$$\vec{R} = L_0(\vec{p}, \vec{k}) \sum_{i=1}^n a_i e^{i\vec{k}\cdot\vec{d}_i \Delta} + \frac{1}{\Delta^2} \sum_{i=1}^n b_i e^{i\vec{k}\cdot\vec{d}_i \Delta} = 0 \tag{13}$$

Let the normalized wavenumber $\overline{\vec{k}} = \vec{K}\Delta$ then:

$$\vec{R} = L_0(\vec{p}, \vec{k}) \sum_{i=1}^n a_i e^{i\vec{k}\cdot\vec{d}_i} + \sum_{i=1}^n b_i e^{i\vec{k}\cdot\vec{d}_i} = 0. \tag{14}$$

Simplifying, with $l_2$ norm as the measure of error, the following optimization equation results:

$$\min_{a_{i_1}\cdots j_1\cdot k_1, b_{i_1}\cdots j_1\cdot k_1} \sum_{\vec{k}\in\Omega_n} \left|L_0(\vec{p}, \vec{k}) \sum_{i=1}^n a_i e^{i\vec{k}\cdot\vec{d}_i} + \sum_{i=1}^n b_i e^{i\vec{k}\cdot\vec{d}_i}\right|^2. \tag{13}$$

Assuming an approximation of the equation with $n_p$ grid points in a wavelength, yields:

$$\Omega = \left\{\vec{k} \middle| |k_x| \leq \frac{\Pi}{n_p}, |k_y| \leq \frac{\Pi}{n_p}, |k_z| \leq \frac{\Pi}{n_p}\right\}$$

$\Omega$ can be sampled and $\Omega_h$ can be obtained as:

$$\Omega_h = \left\{ \vec{k} \mid \overline{k}_x = \frac{\Pi i_2}{n_p N_s}, \overline{k}_y = \frac{\Pi j_2}{n_p N_s}, \overline{k}_z = \frac{\Pi k_2}{n_p N_s}, \right.$$

$$\left. \forall\, i_2 = -N_s \ldots N_s,\, j_2 = -N_s \ldots N_s,\, k_2 = -N_s \ldots N_s \right\}$$

For each of the parameters, $B, \eta$, the above optimization equation can be solved to obtain the best finite difference coefficients.

In the case where $L_0(\vec{p}, \vec{K}, \omega) = L_0(\vec{K}, \omega)$ is independent of $\vec{p}$, such as in the isotropic acoutic wave, the optimal coefficients do not depend on $\vec{p}$. In the case that $Lo(\vec{p}, \vec{K}, w)$ depends on $\vec{p}$, and the relative optimal coefficients also depend on $\vec{p}$.

Next, consider the choice of the neighborhood $\{\overline{x}_i\}_{i=1}^n$. For a 9-points scheme in the two-dimensional case:

$$\{\vec{x}_i\}_{i=1}^n = \{\vec{x} + i_1 \vec{e}_1 \Delta, \vec{x} + j_1 \vec{e}_2 \Delta \mid i_1 = -1, 0, 1,\, j_1 = -1, 0, 1\}.$$

In the above formulation, $\vec{e}_1 = (1,0)$ and $\vec{e}^2 = (0,1)$ are the unit vector in the two directions. For the case of equally distributed n points:

$$\{\vec{x}_i\}_{i=1}^n = \left\{ \vec{x} + \left(\cos\left(\frac{i}{2\Pi n}\right), \sin\left(\frac{i}{2\Pi n}\right)\right)\Delta \,\Big|\, i = 1 \cdot n \right\}.$$

For a 27-point scheme in three-dimensional space:

$$\{\vec{x}_i\}_{i=1}^n = \{\vec{x} + i_1 \vec{e}_1 \Delta, \vec{x} + j_1 \vec{e}_2 \Delta,$$

$$\vec{x} + k_1 \vec{e}_3 \Delta \mid i_1 = -1, 0, 1,\, j_1 = -1, 0, 1,\, k_1 = -1, 0, 1\}.$$

In the above formulation, $\vec{e}_1 = (1,0,0)$, $\vec{e}_2 = (0,1,0)$ and $\vec{e}_3 = (0,0,1)$ are the unit vector in the three directions. In the case of a free surface boundary condition, boundary points can be added into the neighborhood of $\vec{x}$ to correct the coefficients of $\vec{x}$.

Example 3

Isotropic Parameters

Figure 8A:
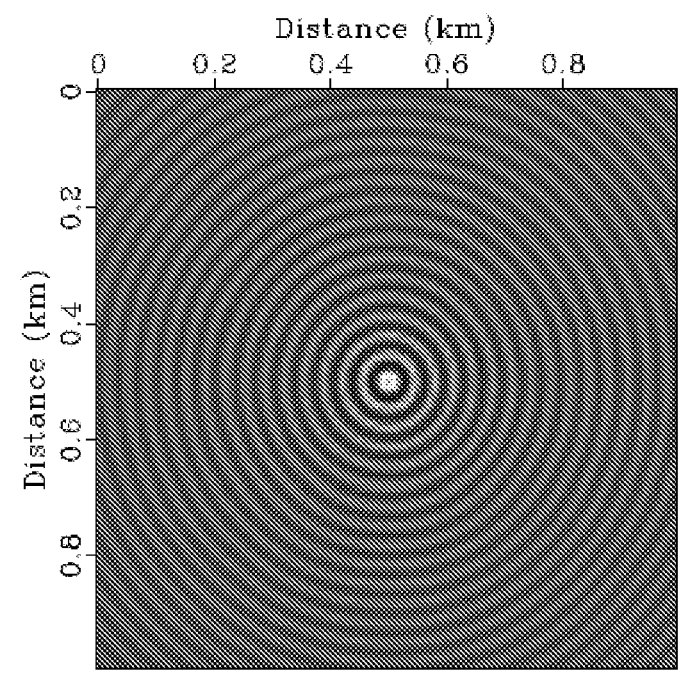
FIGS. 8A-8B illustrate a real part and an imaginary part of a wavefield, respectively, for a 1.0 km by 1.0 km area at a sampling rate of 0.01 km, velocity of 1.5 km/s and frequency of 45 Hz., according to one or more embodiments of the present disclosure.
Figure 8B:
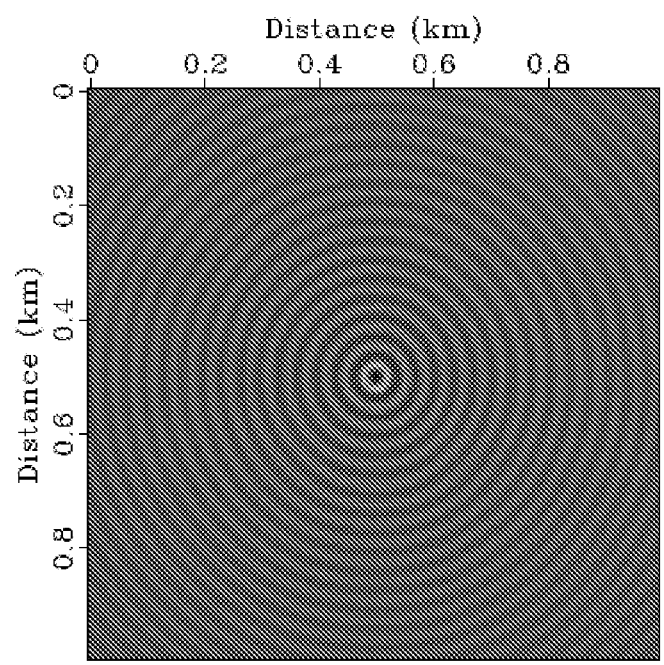

FIGS. 8A-B illustrate a wavefield representation of real and imaginary parts. The frequency was 45 Hz. The space sampling is 0.01 km. The shot was located in the middle of the region. As shown in FIGS. 8A-B, no shear wave artefacts were observed in the modeled wavefield. To confirm the absence of shear wave artefacts, the wavefield was obtained for all frequencies and then wavefields were summed for all frequencies with a snapshot taken at 1.65 seconds.

Figure 9:
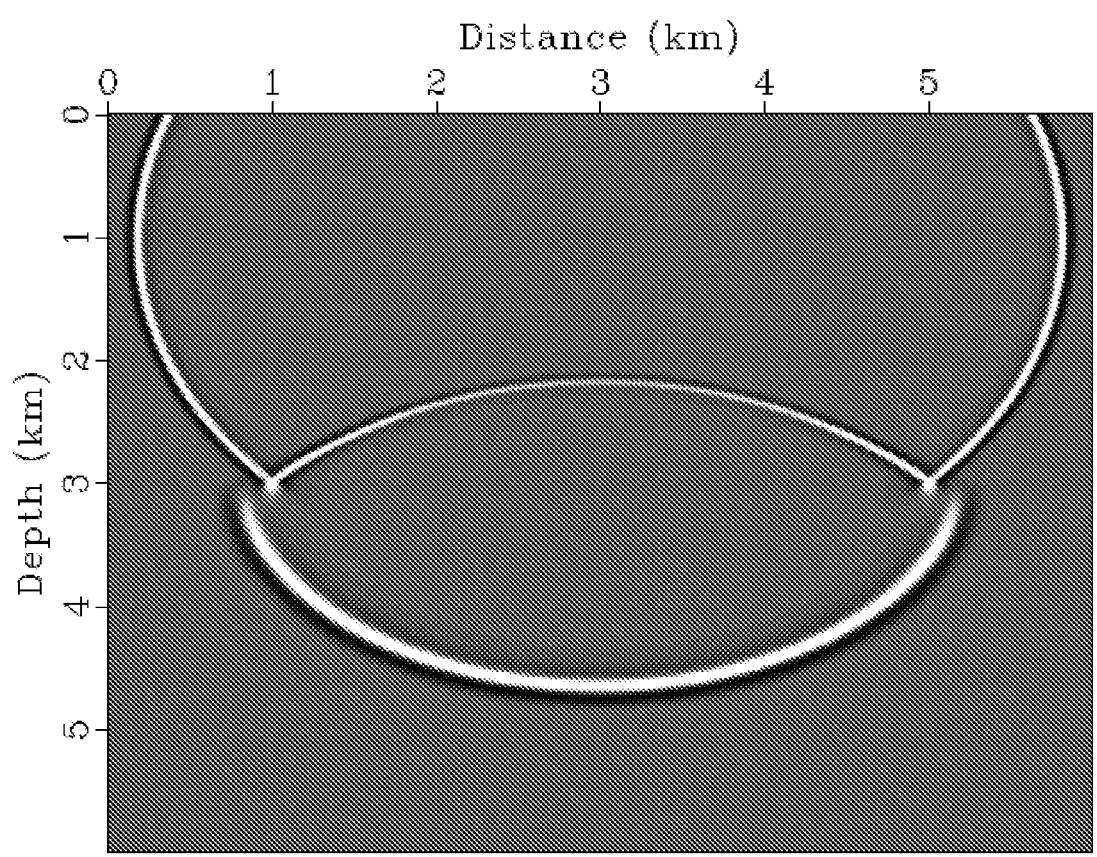
FIG. 9 illustrates a snapshot at 1.875 seconds of the wavefields for all frequencies, according to one or more embodiments of the present disclosure.
Figure 10:
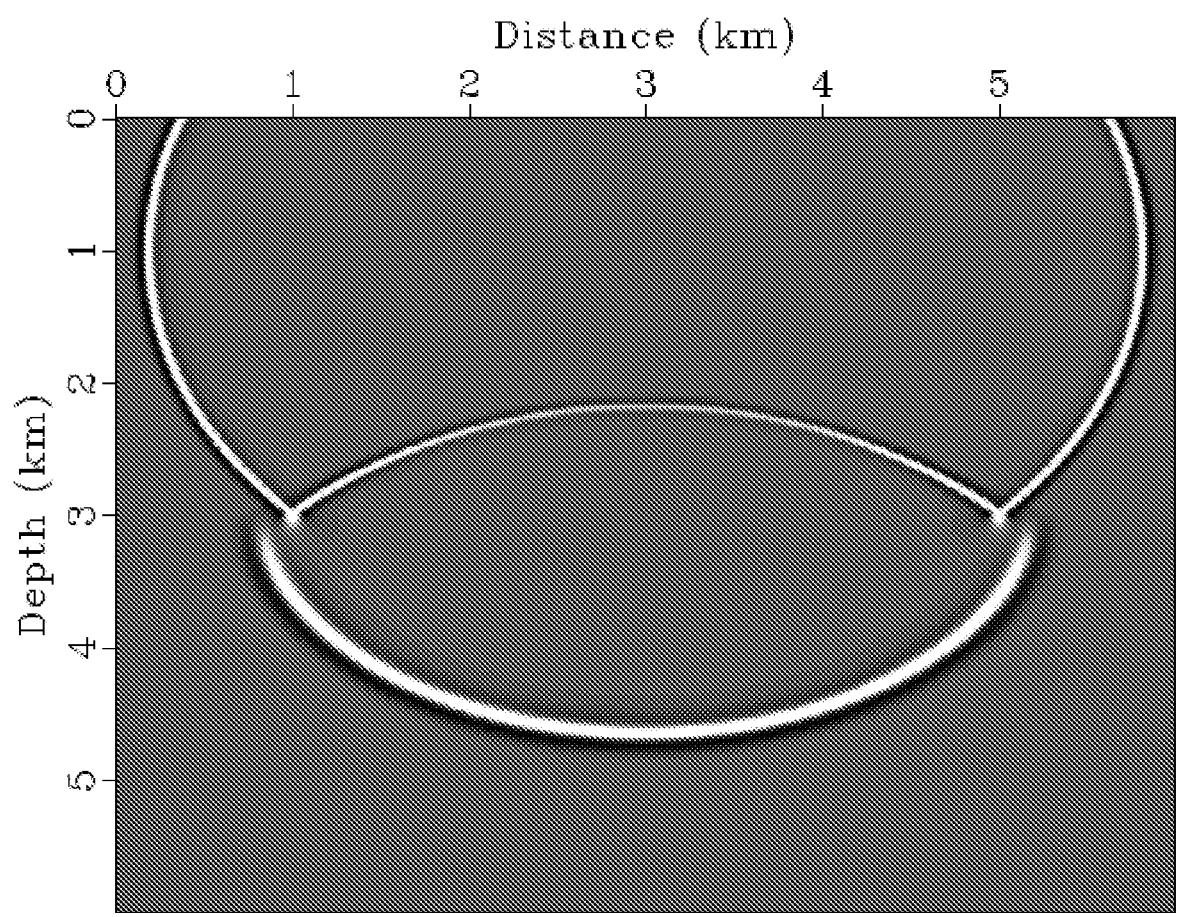
FIG. 10 illustrates a snapshot of a low-rank method at 1.875 seconds of the wavefield for all frequencies.

The accuracy of the proposed method was evaluated against a low-rank method for a single interface problem. An investigation area of 6 km by 6 km was defined. The velocity at the top layer was 1.5 km/s and the velocity at the bottom layer was 3 km/s. The source was located at a depth of 1 km at a distance of 3 km. The wavefield was calculated at all frequencies, then inverse Fourier transforms were applied to obtain the wavefield in the time domain. The snapshot at 1.875 S of the proposed method is shown in FIG. 9. For comparison, the snapshot of a low-rank method is shown in FIG. 10. This indicates that the proposed method is reasonably accurate for the single interface problem.

Example 4

Anisotropic Parameters

Figure 11A:
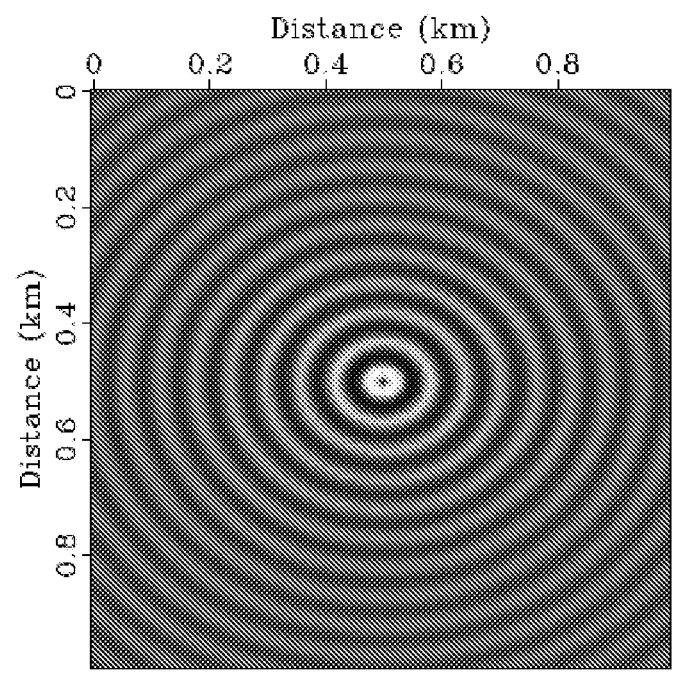
FIGS. 11A-11B illustrate a real part and an imaginary part of a wavefield, respectively, for a 1.0 km by 1.0 km area with an elliptic anisotropic media of $v_x=1.8$ km/s and $v_z=1.5$ km/s, according to one or more embodiments of the present disclosure.
Figure 11B:
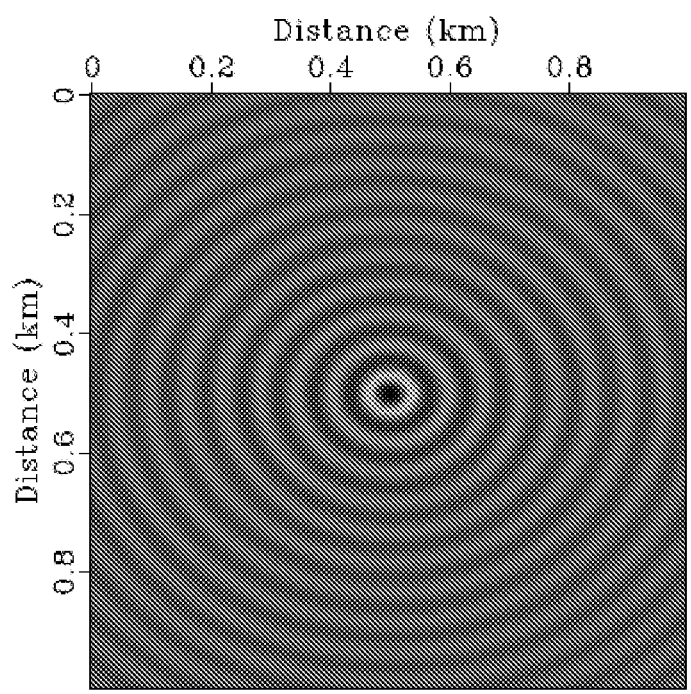
Figure 12A:
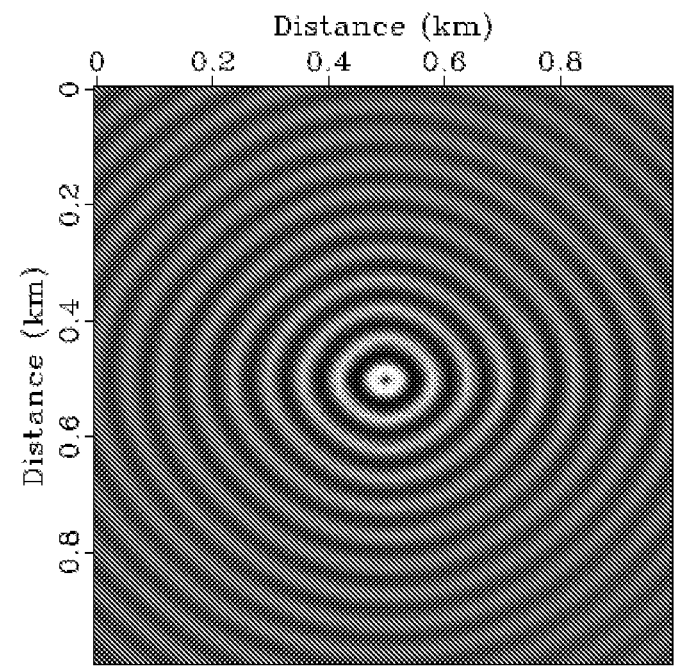
FIGS. 12A-12B illustrate a real part and an imaginary part of a wavefield, respectively, for a 1.0 km by 1.0 km area within a VTI media of $v_x=1.8$ km/s, $v_z=1.5$ km/s and $\eta=0.2$, according to one or more embodiments of the present disclosure.
Figure 12B:
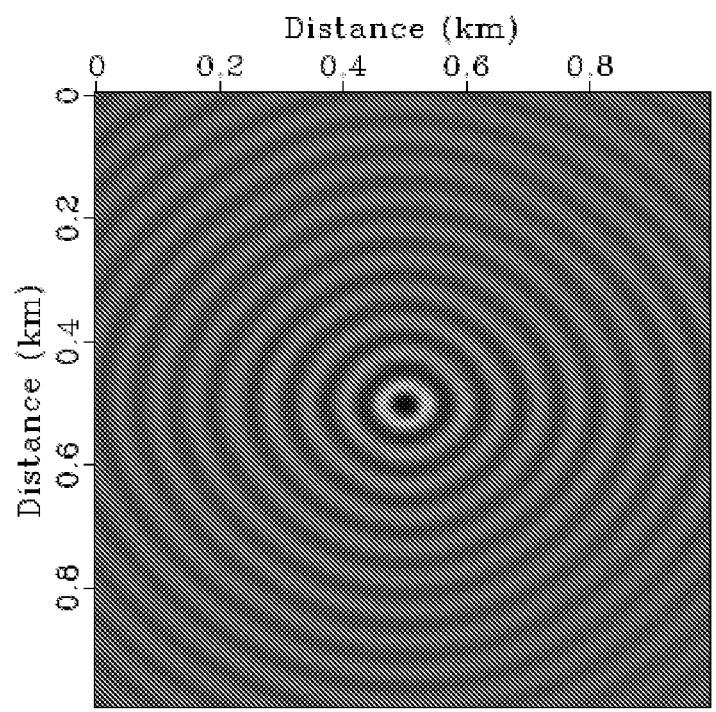
Figure 13A:
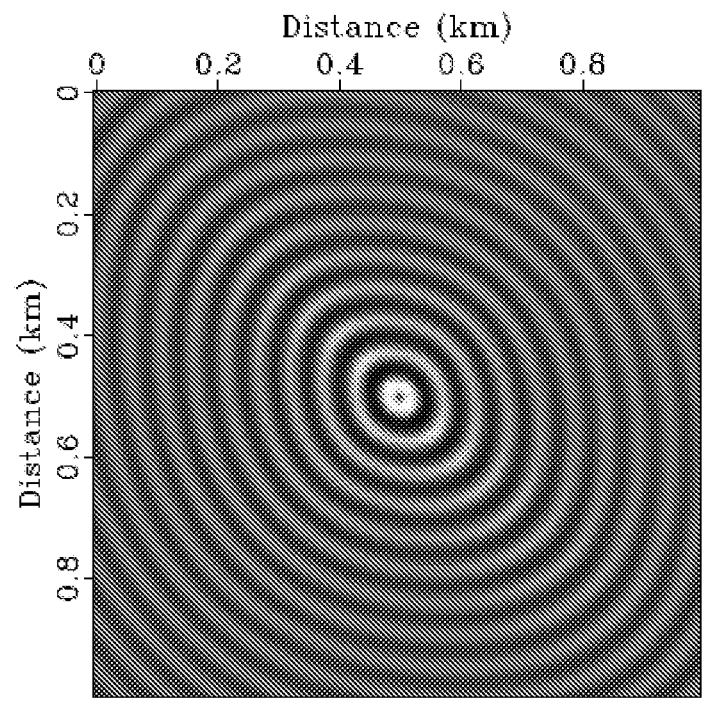
FIGS. 13A-13B illustrate a real part and an imaginary part of a wavefield, respectively, for a 1.0 km by 1.0 km area within a TTI media of vx=1.8 km/s, vz=1.5 km/s, $\eta=0.2$ and $\theta=45°$, according to one or more embodiments of the present disclosure.
Figure 13B:
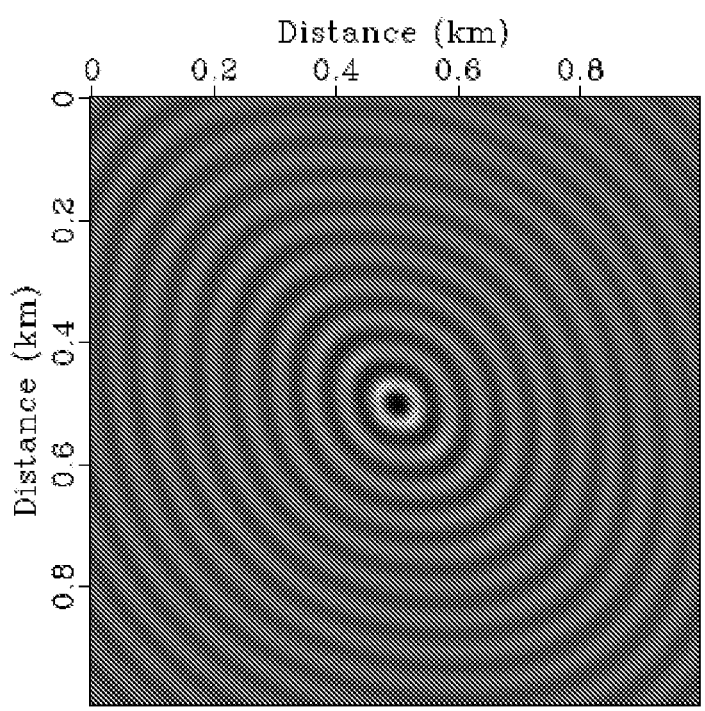

Next, the accuracy of the proposed method was evaluated for modeling anisotropic acoustic waves. Due to the more complicated physics, 5 points per wavelength were used for anisotropic acoustic wavefield modeling. FIGS. 11a and 11b show real and imaginary parts of the wavefield modeled with elliptical anisotropic media of $v_x$=1.8 km/s and $v_z$=1.5 km/s. FIGS. 12a and 12b show the real and imaginary parts of the wavefield modeled with VTI media of $v_x$=1.8 km/s and $v_z$=1.5 km/s and $\eta$=0.2. FIGS. 13a and 13b show the real and imaginary parts of the wavefield modeled with TTI media of $v_x$=1.8 km/s, $v_z$=1.5 km/s $\eta$=0.2 and $\theta$=45°. As shown in FIGS. 11-13, there is no discernible S-wave artefacts which typically appear in the conventional finite difference modeling. The modeled wavefield thus yields reasonable accuracy.

Figure 14:
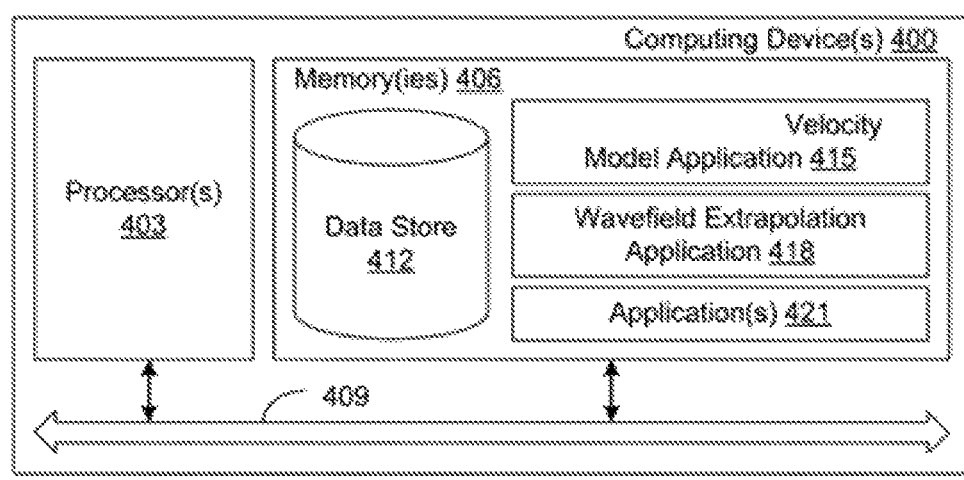
FIG. 14 is a schematic block diagram of a computing device in accordance with various embodiments of the present disclosure.

With reference to FIG. 14, shown is a schematic block diagram of a computing device 400 according to various embodiments of the present disclosure. The computing device 400 includes at least one processor circuit, for example, having a processor 403 and a memory 406, both of which are coupled to a local interface 409. To this end, the computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 may be a velocity model application 415, a wavefield extrapolation application 418, and/or other applications 421. In some implementations, the effective velocity model application 415 and wavefield extrapolation application 418 may be combined into a common application. Also stored in the memory 406 may be a data store 412 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, JAVA, FLASH, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD) or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, optical discs accessed via an optical disc drive, magnetic tapes accessed via an appropriate tape drive, and/or other memory components, or a combination of any two or more of these memory components. In addition, the RAM may comprise, for example, static random-access memory (SRAM), dynamic random-access memory (DRAM), or magnetic random-access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the velocity model application 415, the wavefield extrapolation application 418, application(s) 421, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Although the flowchart of FIG. 2 shows a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. Further, in some embodiments, one or more of the blocks shown in FIG. 2 may be skipped or omitted (in favor, e.g., measured travel times). In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random-access memory (RAM) including, for example, static random-access memory (SRAM) and dynamic random-access memory (DRAM), or magnetic random-access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus, the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A method for imaging geological subsurface features using a seismic surface recording, the method comprising the steps of:
    providing the seismic surface recording including data scattered by multiple geological subsurface scatterers within a geological subsurface environment;
    generating, by a computing device, a wave equation based on the data having a linear portion and a nonlinear portion;
    solving, by the computing device, the wave equation using an iterative process including, at each iteration, performing a lower-upper decomposition of the linear portion before solving the nonlinear portion;
    rendering, by the computing device, an image of the geological subsurface features based on an output of the previous step for presentation by a display device; and
    graphically displaying the image of the geological subsurface features rendered by the computing device in the previous step on the display device, wherein the steps are performed in the order listed.

2. The method of claim 1, wherein the wave equation is a Helmholtz representation in the frequency domain.

3. The method of claim 1, wherein the wave equation is a dispersion relation for one or more of anisotropic, viscoelastic, and viscoacoustic media.

4. The method of claim 1, wherein the iterative process is a fixed-point iterative process and wherein the iterative process updates a solution of the nonlinear portion using a previously obtained lower-upper decomposition.

5. The method of claim 1, wherein the iterative process includes solving for $u_{i+1}$ based on a known solution $u_i$, where i is equal to 0 to n and where n is any positive integer.

6. The method of claim 1, wherein the wave equation is solved without introducing any shear wave artefacts.

7. The method of claim 1, wherein the iterative process includes obtaining a best finite difference for a dispersion equation.

8. A system for identifying geological subsurface features based on data in a seismic surface recording, comprising:
    a computing device;
    a display device; and
    an imaging application executable by the computing device, where execution of the imaging application causes the computing device to:
        define a wave equation based on the data in the seismic surface recording which includes data scattered by multiple geological subsurface scatterers, wherein the wave equation includes a linear portion and a nonlinear portion;
        solve the wave equation via an iterative process including, at each iteration, performing a lower-upper decomposition of the linear portion before solving the nonlinear portion,
        generate an image of the geological subsurface features based on the wave equation solution, and
        render the image of the geological subsurface features on the display device.

9. The system of claim 8, wherein the wave equation is a Helmholtz representation in the frequency domain.

10. The system of claim 8, wherein the wave equation is a dispersion relation for one or more of anisotropic, viscoelastic, and viscoacoustic media.

11. The system of claim 10, wherein the iterative process is a fixed-point iterative process.

12. The system of claim 10, wherein the iterative process includes solving an optimization equation.

13. The system of claim 8, wherein the iterative process yields best finite difference coefficients for a dispersion relation within a neighborhood group.

14. A non-transitory computer readable medium having a program producing an image of geological subsurface features based on data stored a seismic surface recording, said program, when executed by processing circuitry including a processor, causes the processing circuitry to:
    generate an image of the geological subsurface features from the data stored in the seismic surface recording which includes data scattered by multiple geological subsurface scatterers, wherein the image is generated by solving a wave equation based on the data, wherein the wave equation has a linear and nonlinear portion and wherein the wave equation is solved via an iterative process including performing a lower-upper decomposition of the linear portion at each iteration before solving the nonlinear portion; and
    render the image for display on a display device to distinguish the geological subsurface features captured in the data of the seismic surface recording.

15. The non-transitory computer readable medium of claim 14, wherein the wave equation is a Helmholtz representation in the frequency domain.

16. The non-transitory computer readable medium of claim 15, wherein the wave equation is a dispersion relation for anisotropic, viscoelastic or viscoacoustic media.

17. The non-transitory computer readable medium of claim 14, wherein the iterative process is a fixed-point iterative process.

18. The non-transitory computer readable medium of claim 14, wherein the iterative process includes solving for $u_{i+1}$ based on a known solution $u_i$, where i is equal to 0 to n and where n is any positive integer.

19. The non-transitory computer readable medium of claim 14, wherein the wave equation is solved without introducing any shear wave artefacts.

20. The non transitory computer readable medium of claim 14, wherein the iterative process includes obtaining a best finite difference for a dispersion equation.

\* \* \* \* \*